Oct. 21, 1941. L. A. HINKLE 2,260,103
AUTOMATIC CUTOFF MEANS FOR FLAT DRAWN SHEET GLASS
Filed June 19, 1940 5 Sheets-Sheet 2
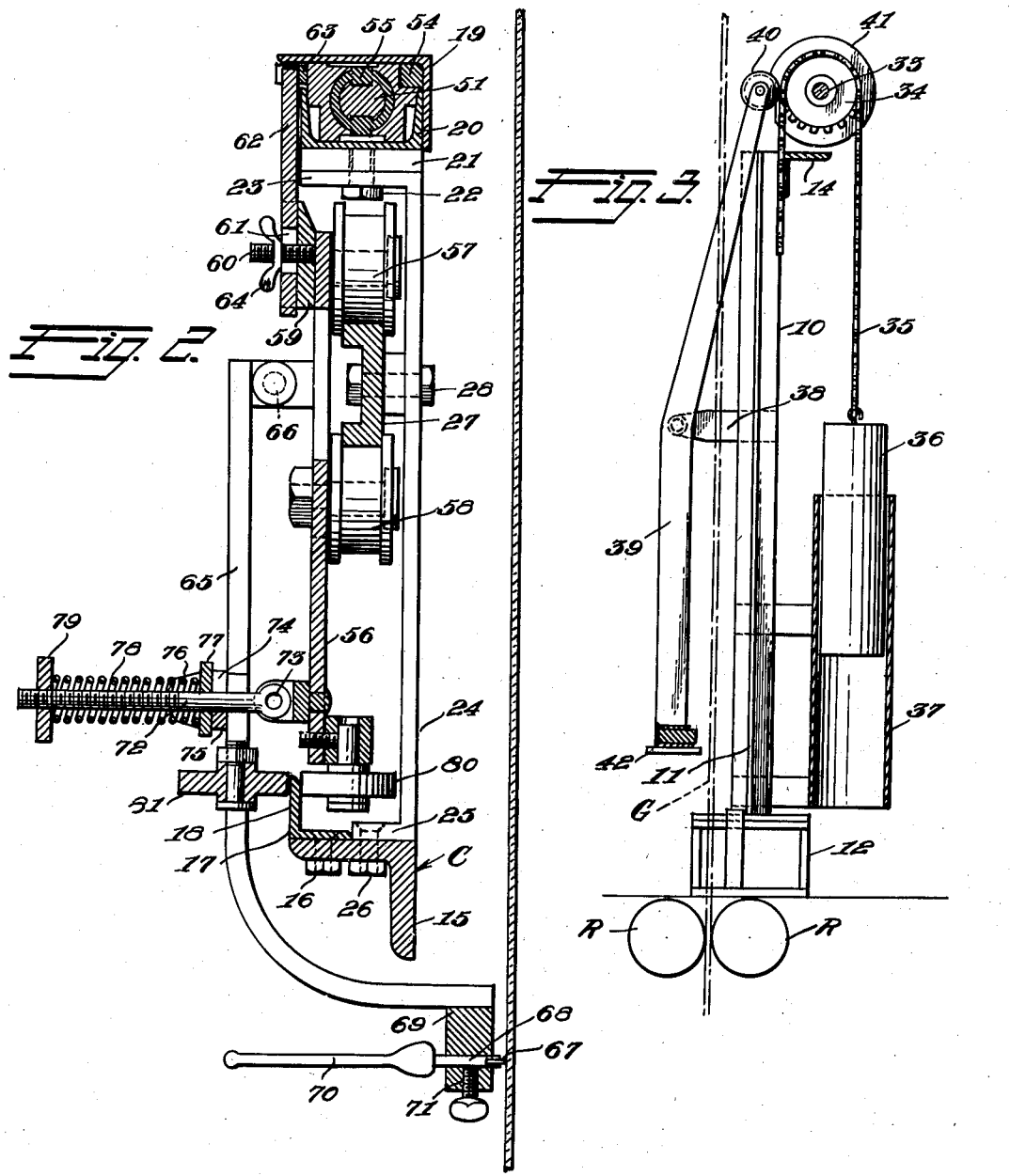
Inventor
Leslie A. Hinkle
By George E. Cook.
Attorney

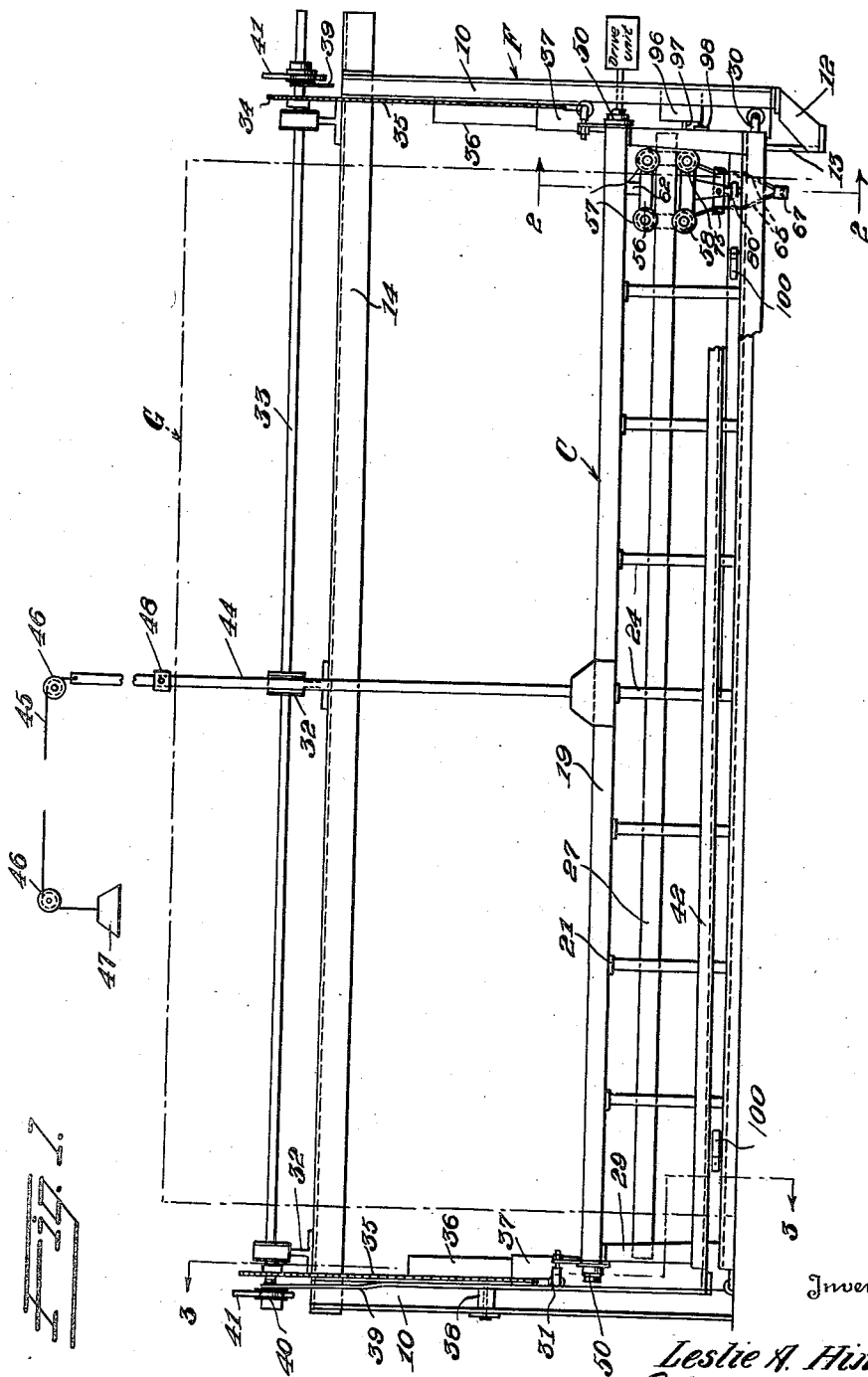

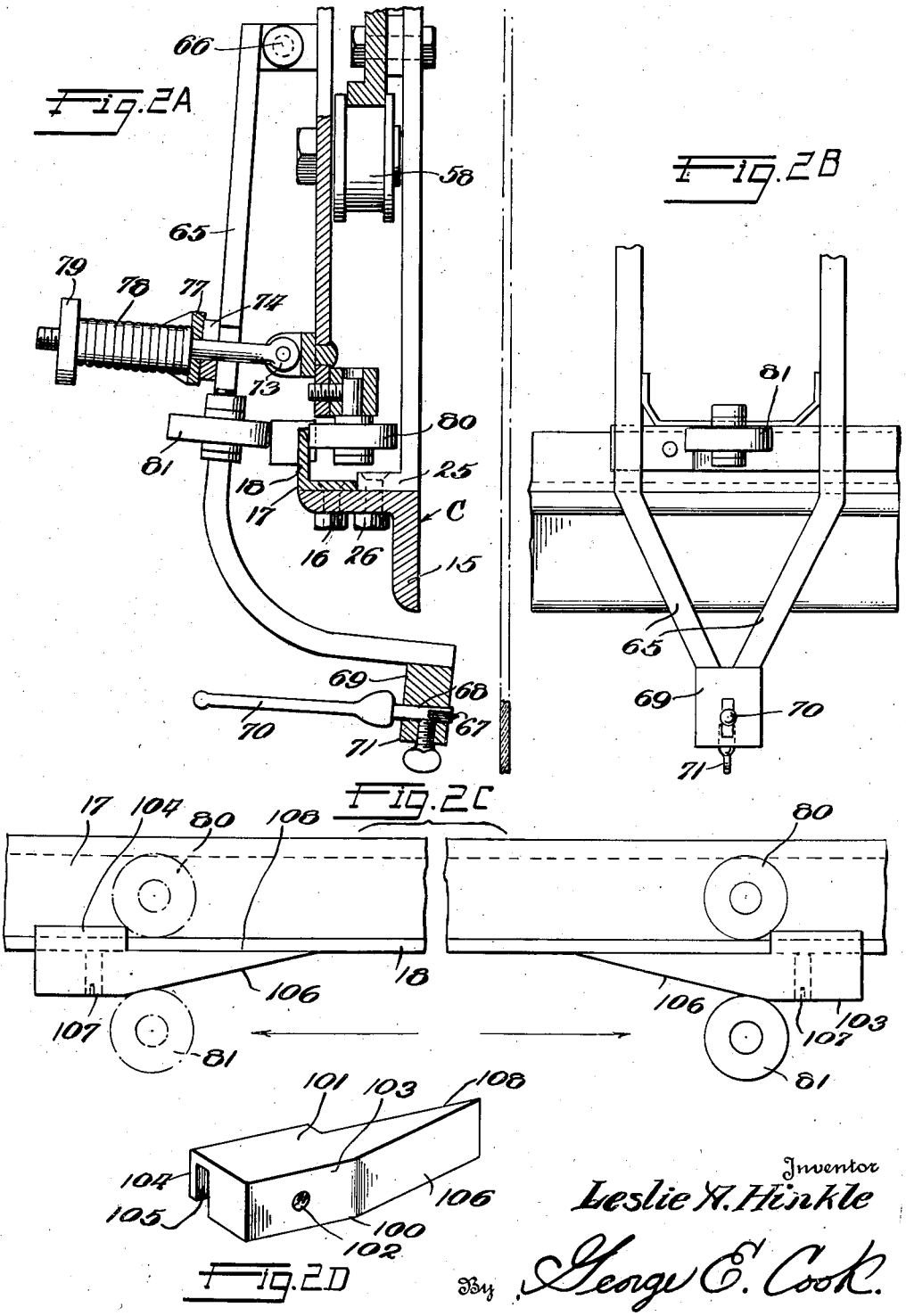

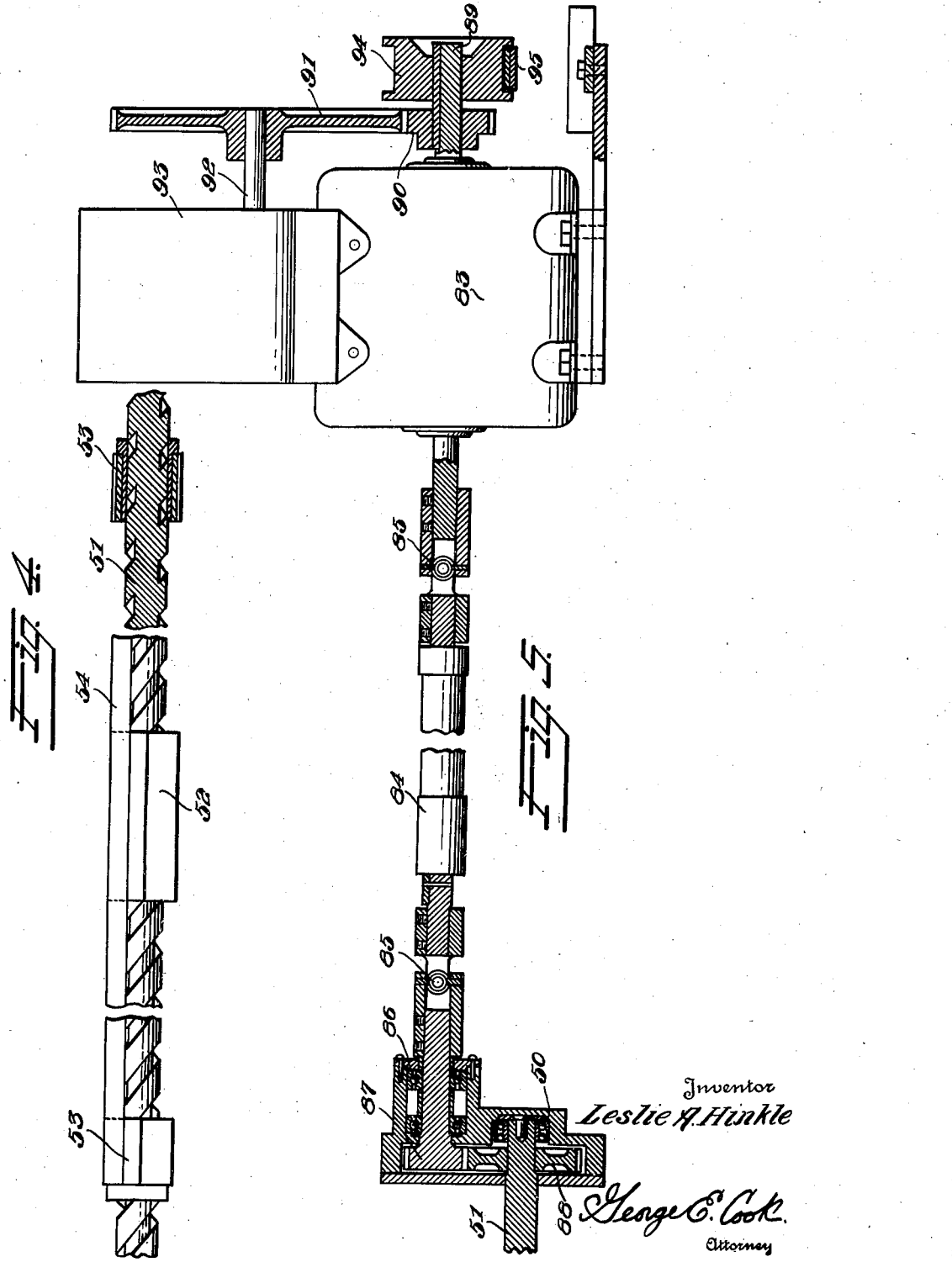

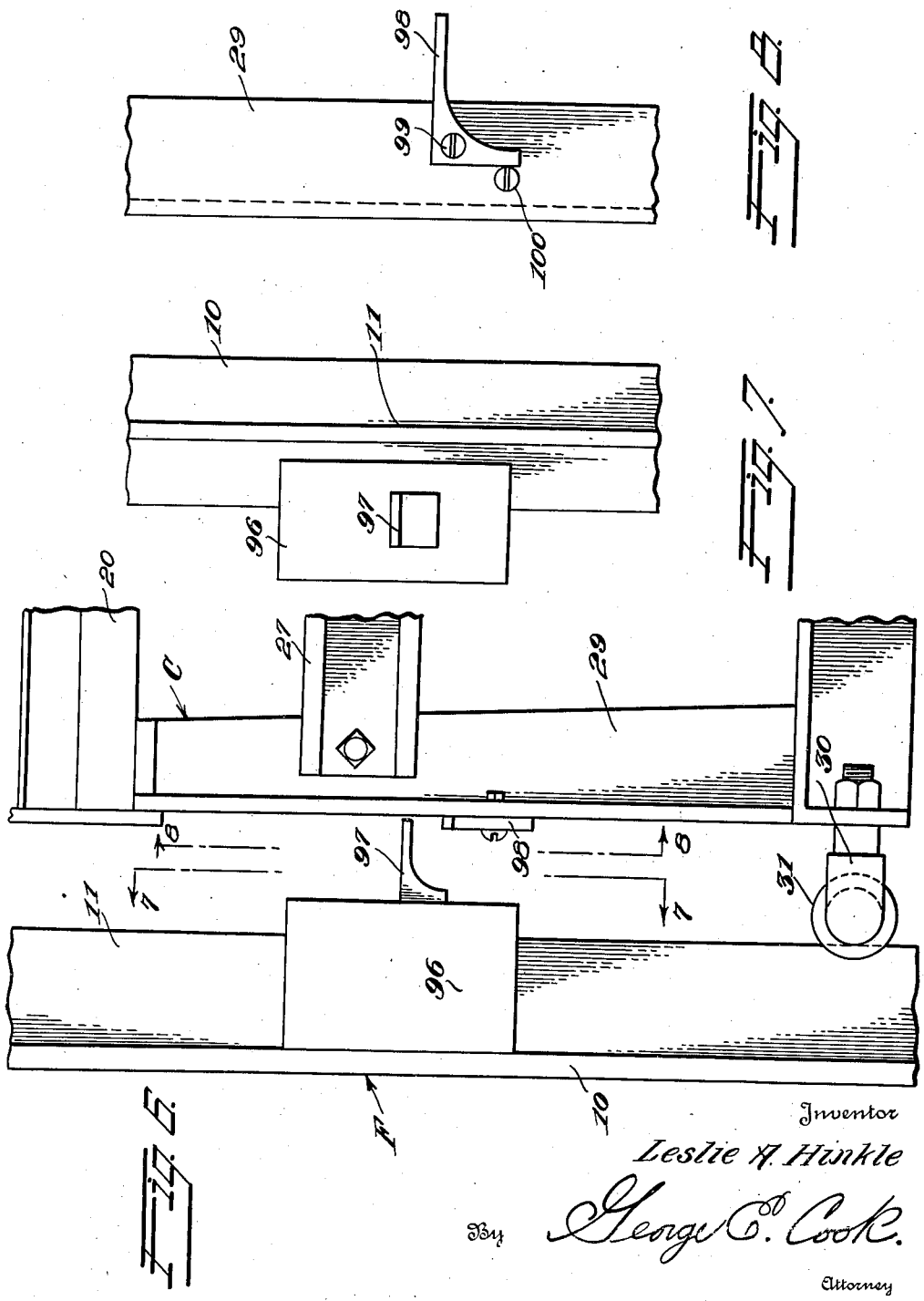

Patented Oct. 21, 1941

2,260,103

UNITED STATES PATENT OFFICE 2,260,103

AUTOMATIC CUTOFF MEANS FOR FLAT DRAWN SHEET GLASS

Leslie A. Hinkle, Clarksburg, W. Va., assignor to Rolland Glass Company, Clarksburg, W. Va., a corporation of West Virginia Application June 19, 1940, Serial No. 341,366

15 Claims. (Cl. 33—32)

This invention relates to automatic cut-off means for flat drawn sheet glass.

More specifically, the invention relates to automatic means for successively cutting predetermined uniform lengths of glass plates during the uniform vertical movement of the flat drawn sheet glass from the exit end of the annealing lehr.

Heretofore, the most practical method utilized in the cutting of plates of glass was by hand power. This method, however, offered many disadvantages and was not in keeping with the otherwise automatic manufacture of the flat drawn sheet glass.

In the hand power method of cutting the plates of glass it is difficult, if not impossible, to subject the cutter to uniform and constant pressure with the result that the depth of the cut is either too heavy or too light and in many instances varying from one to the other throughout the length of the cut, such an imperfect cut results in a ragged break and occasionally the loss of the plate due to breakage.

Another objectionable feature to hand cutting is the frequent variation from a straight line cut thereby causing the plate or sheet to break unevenly and making it necessary for the sheet to be trimmed on that edge in the cutting room which entails considerable loss in time, labor and glass.

Still another and by far the greatest objection to hand cutting is the element of danger involved to the operator, for the reason that in this stage of the operation the rising glass sheet is relatively fragile at times due to stresses set up by improper annealing which endows the sheet with a tendency to disintegrate into flying fragments which often inflicts severe cuts and occasionally the loss of an eye, limb, or even life itself.

These disadvantages of the hand method of cutting sheet glass have heretofore been recognized and efforts have been made to substitute mechanical cut-off means therefor.

Such mechanical means have not, however, improved upon the hand method except possibly as regards the element of safety as the mechanical means heretofore used or proposed either cut unevenly, or not in a straight line, or at varying sheet lengths or failed altogether, and are often the direct cause of excessive breakage in sheets thereby resulting in non-economical production.

The primary object of this invention is the provision of a mechanical cut-off machine which automatically cuts successive glass plates into predetermined uniform lengths during the continuous vertical movement of the flat drawn glass sheet from the exit end of the annealing lehr.

A further object of the invention is the provision of a mechanical cut-off machine whereby the annealed sheet of glass is subjected to a uniform depth cut in a straight line across the full width of the glass sheet thereby eliminating the tendency to mar and frequently destroy the sheet.

A still further object of the invention is the provision of a glass sheet cut-off machine which is capable of so cutting successive plates of sheet glass that cutting room work on two edges of the plates is eliminated, thereby creating savings in time, labor and glass.

A still further object of the invention is the provision of a mechanical cut-off machine which is entirely automatic in operation whereby the heretofore present danger element is totally eliminated.

A still further object of the invention is the provision of a mechanical cut-off machine embodying a cutting wheel which engages the glass sheet with uniform pressure at all times whereby the life and efficiency of such wheel is substantially increased over that with the heretofore hand operated wheels which were subjected to rougher treatment.

Yet another important object of the invention is the inclusion of adjustable means whereby the glass cutter is automatically actuated to be lowered upon and raised from the sheet of glass being cut, the adjustment of said means to predetermined positions controlling the width of the cut in the glass sheet.

Other objects and advantages of the invention will become more apparent during the course of the following detailed description, and among which may be mentioned the facilitating and expediting of the capping off operations by reduced and easier handling of the glass, and increased output with a corresponding decrease in the cost of production.

Of the accompanying drawings, forming part of the disclosure of the invention,

Fig. 1 is a side elevational view of the cut-off machine less the drive control means for the cutter guide which is indicated diagrammatically.

Fig. 2 is a vertical transverse sectional view in a plane substantially as represented by the line 2—2 in Fig. 1.

Fig. 2A is a view similar to Fig. 2, partly broken away, showing the cutter raised from the glass.

Fig. 2B is a side elevational view of a portion of the structure shown in Fig. 2A.

Fig. 2C is a plan view of the cams which raise and lower the cutter at the cutting limits.

Fig. 2D is a perspective view of one of the cutter raising and lowering cams.

Fig. 3 is a vertical transverse sectional view in a plane substantially as represented by the line 3—3 in Fig. 1.

Fig. 4 is a broken view partly in elevation and partly in axial section of the cutter guide operating screw and the guide support cooperating therewith.

Fig. 5 is a view partly in elevation and partly in vertical longitudinal section of the screw driving and controlling means.

Fig. 6 is a fragmental side elevational view of a portion of the frame and the carriage, particularly disclosing the means for setting the driving motor into operation upon vertical movement of the carriage.

Fig. 7 is an elevational view as seen in a plane represented by the line 7—7 in Fig. 6.

Fig. 8 is a similar view as seen in a plane represented by the line 8—8 in Fig. 6.

Referring no win detail to the drawings by the use of reference characters, and wherein like characters designate like parts in the different views, F designates the supporting frame which is disposed above and preferably secured to the top of the annealing lehr (not shown).

The frame F includes opposed end uprights 10 preferably of T-iron construction thereby providing opposed inwardly directed carriage guide flanges 11 and each upright 10 is supported on a base 12 having a carriage stop 13 connected therewith. The uprights 10 are spanned at their upper ends by an L-iron bar 14 which completes the frame.

A cutter supporting carriage C is supported within the frame F for vertical movement therein and comprises a lower horizontal L-iron member 15 adjacent the free edge of whose horizontal leg is secured by bolts 16 a lighter gauge L-iron member 17 presenting a vertical guide flange 18. The carriage C further includes a housing for the cutter guide operating screw including an upper L-iron member 19 whose vertical leg is suitably secured to one flange of a channel member 20 as is clearly indicated in Fig. 2, the members 19 and 20 providing a horizontal housing for the screw, later described.

The member 20 is supported on longitudinally spaced pillows 21 which in turn are supported on and secured by bolts 22 to the upper horizontal flanges 23 of vertical bars 24 having lower horizontal flanges 25 secured by bolts 26 to the horizontal leg of the L-iron member 15. Extending between and parallel with members 15 and 20 is a channel member 27 secured to the bars 24 by bolts 28.

The carriage C is completed by vertical end bars 29. Brackets 30 are supported by opposed ends of the carriage C and which support grooved anti-friction rollers 31 engaging the frame flanges 11 for proper guidance of the carriage in its vertical movement in a manner hereafter described.

A plurality of bearing brackets 32 are supported by the top frame bar 14 in which is rotatably journalled a shaft 33. A sprocket wheel 34 is secured to the shaft adjacent each end thereof and about which is trained a sprocket chain 35.

The chains 35 are secured at corresponding ends thereof to the carriage C and the opposite ends of the chains are secured to vertically movable weights 36 having guidance in tubular guides 37 suitably fixed to the frame F.

It may at this point be noted that the carriage C and weights 36 substantially counterbalance each other, the carriage, however, overcoming the weights sufficiently to remain in lower inoperative position against the stops 13 when not subjected to pressure vertically upward.

A bracket 38 is secured to each frame upright 10 intermediate the upper and lower ends thereof and a lever 39 is pivotally secured intermediate its ends to each of the brackets.

Rollers 40 are journalled on the upper ends of the levers 39, the rollers engaging cams 41 secured to the shaft 33 adjacent the sprocket wheels 34.

As will be apparent from Fig. 3, the levers 39 are of angular form whereby the rollers 40 will remain in contact with the cams 41.

The cams 41 have a concentric periphery for the major portion of the circumference thereof and a re-entrant or low portion which are engaged by the rollers 40 in the lower or inoperative position of the carriage C.

Secured to the lower ends of the levers 39 is a pressure or back-up bar 42 which is parallel with the rising glass sheet G and slightly spaced therefrom in the inoperative position of the carriage as is apparent from Fig. 3.

A graduated measuring rod 44 is secured at its lower end to the carriage C centrally of the length thereof and the upper end of the rod has secured thereto one end of a cable 45 which is trained about a pair of suitably supported pulleys 46 and the opposite end of the cable is secured to a counter-balance weight 47.

A glass plate length measuring stop 48 is adjustably secured to the measuring rod 44 for engagement with the advancing free edge of the annealed glass sheet in a manner later to be described.

Journalled in bearings 50 at opposite ends of the carriage C is a double thread screw 51 rotatably supported within the housing formed by the members 19 and 20 as indicated in Fig. 2.

A cutter guide supporting and actuating means is engaged with the screw 51 and includes a nut 52 and opposed guide or aligning members 53. The nut 52 and members 53 are connected by a bar 54. The nut 52 is preferably provided with babbit 55 which is preferably poured while the nut is on the screw.

The cutter guide includes a frame 56 having longitudinally spaced upper flanged rollers 57 rotatably journalled thereon and longitudinally spaced lower flanged rollers 58 journalled thereon, and the rollers 57 and 58 respectively engage the upper and lower edges of the channel member 27 for free movement of the cutter guide back and forth on the carriage C from one end thereof to the other in a manner hereinafter described.

The upper edge of the guide frame 56 supports a channel member 59 provided with a threaded stud 60 which extends through a vertically elongated slot 61 in the lower end of a bar 62 whose upper end loosely engages a recess in a clip 63 secured to the nut 52. The stud 60 is engaged by a wing nut 64 which holds the bar 62 in rigid engagement with the member 59.

It will be seen that by this construction, horizontal movement of the nut as occasioned upon rotation of the screw will impart like horizontal movement of the guide frame 56.

A pair of longitudinally spaced cutter supporting members 65 are pivotally connected with the frame 56 at 66 and adjustably support a cutter 67 at their lower ends.

As indicated in Fig. 2 the cutter is carried by a shank 68 horizontally movable in an aperture in a block 69 through a handle member 70 and the shank is held in adjusted position by means of a set screw 71. The block 69 is suitably secured to the lower ends of members 65.

An eye bolt 72 is pivotally connected to the frame 56 at 73 and the bolt extends through a slot 74 in a member 75 secured to ears 76 on members 65. A washer 77 surrounds the bolt 72 and engages member 75 and a coil spring 78 encircles the bolt with its opposite ends engaging the washer 77 and an adjusting nut 79.

A roller 80 is journalled on the lower edge of the frame 56 for engagement with one side of the vertical guide flange 18 and a similar roller 81 is journalled between the members 65 for engaging the opposite side of the guide flange 18.

The adjustable spring 78 provides constant pressure of the cutter 67 against the glass sheet G during the cutting operation.

The screw 51 is driven by a motor 83 suitably mounted adjacent the frame F and the drive between the motor 83 and the screw 51 is in the form of a flexible shaft 84 including universal joints 85, the flexible shaft being necessary due to the vertical movement of the screw 51 supported by the carriage C relatively to the stationary motor 83.

The flexible shaft 84 is rotatably journalled in a bearing 86 in the same housing in which the bearing 50 is arranged and the flexible shaft carries a gear 87 in driving engagement with a larger gear 88 on the adjacent end of the screw 51.

The motor shaft 89 has keyed thereto a gear 90 meshing with a substantially larger gear 91 on the shaft 92 of a traveling limit switch 93 and the motor shaft 89 also has keyed thereto a brake drum 94 with which cooperates a brake shoe 95.

Supported by one of the uprights 10 of the frame F is a limit switch 96 provided with an operating lug 97 which projects into the path of movement of a trip 98 carried by the carriage C.

The trip 98 is pivotally connected to the carriage as at 99 and normally engages a stop pin 100 whereby the lug 97 will be operated by the trip 98 upon upward movement of the carriage C but upon downward movement of the carriage the trip will pivot away from the stop pin and accordingly will have no action on the lug 97.

Referring now particularly to Figs. 2A to 2D inclusive, the means for controlling the length of the cut in the glass will be described.

In Fig. 2D is shown a cam member 100 having a thick block portion 101 provided with an internal threaded aperture 102 normal to the outer face 103 thereof. Inwardly of the other opposed face 104 of the block portion 101 is a short longitudinal groove 105, while merging with outer face 103 of the block 101 is a tapered cam portion 106.

The structure just described is secured to the guide flange 18 as follows. The latter is received within the groove 105 with the straight side 108 of the cam portion 106 in abutment therewith. A set screw 107 serves to lock the cam member 100 in any predetermined position along the L-iron member 17. Two cam members 100 are provided, these being in the relation of mirror images to each other, but one of the members secured to the L-iron member to the right and the other to the left as seen in Fig. 2C. It will be understood that the members 100 may be adjusted along the L-iron member and secured thereto by means of the set screws 107.

As the cutter moves from right to left, see Fig. 2C, the roller 81 will first ride on the surface 103 of the cam member and the cutter supporting members 65 will be actuated about pivot 66 to raise said members from the glass sheet against tension of spring 78. As the supporting members continue moving the roller 81 rides on tapered cam surface 106, thus approaching the glass sheet under pressure from spring 78 to gradually come into cutting contact with said sheet. After the cut has been made the reverse operation takes place when roller 81 contacts cam surface 106 of the cam to the left as seen in Fig. 2C.

Having described the mechanical construction of the improved cut-off machine, the operation thereof is as follows:

The drawn glass sheet G continuously moves vertically from the exit end of the annealing lehr which includes a pair of polishing rolls R as indicated in Fig. 3.

The glass sheet moves upwardly between the carriage C and the back-up bar 42. When the upper edge of the glass sheet engages the measuring stop 48, the carriage is forthwith moved upwardly with the glass sheet.

When the carriage begins to move upwardly the shaft 33 is rotated by the weight tensioned sprocket chains 35 in engagement with the sprocket wheels 34 and the cams 41 are likewise rotated whereupon the rollers 40 move onto the high concentric portions of the cams and through the levers 39 moves the back-up bar 42 into firm engagement with the glass sheet for steadying same in its vertical movement.

Upon continued upward movement of the carriage the trip 98 engages the lug 97 which through the switch 96 sets the motor 83 into operation. The motor thereupon imparts rotation to the screw 51 through the flexible drive shaft 84 which causes the nut 52 to move from one end of the carriage to the other carrying the cutter guide and associated cutter with it and as the cutter moves with the carriage the cut will be perfectly straight.

The traveling limit switch 93 is so set that electric contact is broken when the required number of revolutions of screw 51 to drive the nut 52 across the carriage has been made.

Breaking the circuit automatically closes a circuit which operates the brake shoe 95 thereby bringing the motor shaft speed to zero almost instantly and leaving the cutter guide in position for the succeeding cut on its return trip.

The screw 51 is rotated in opposite directions in successive cutting operations by means of the standard reversing line starter.

After the cut has been made, the break-off operator allows the carriage to move back to its original position under the influence of the weights 36 for the succeeding cut before breaking off the sheet of glass.

Thus it will be seen that an automatic glass cut-off machine is provided in accordance with this invention which is automatic in operation and that a perfectly straight and uniform cut is provided from one edge of the glass sheet to the other.

It is to be particularly noted that the cutter 67 yieldably engages the glass sheet with uniform pressure and the pressure is capable of being readily adjusted by turning the nut 79 and increasing or reducing the compression of the spring 78.

It is to be further noted that the roller 81 in cooperation with the guide flange 18 limits the depth to which the cut is made.

The machine not only cuts with extreme accuracy but no attendants other than the break-off operator are required as the continuously vertically moving glass sheet G controls the cut-off machine, it being necessary only for the break-off operator to release the stop 48 from engagement with the upper edge of the glass sheet for return of the carriage C to its lower inoperative position.

While the improved machine has been disclosed only in a single specific embodiment thereof, such is to be considered as illustrative, and not restrictive, the scope of the invention being defined in the sub-joined claims.

What I claim as new and desire to secure by U. S. Letters Patent is:

1. An automatic glass sheet cut-off machine comprising a fixed frame, a carriage supported by the frame for vertical movement relative thereto, a cutter supported by the carriage for horizontal movement thereon, a back-up bar pivotally supported by the frame, an adjustable stop carried by the carriage and engageable with the upper edge of a vertically movable sheet of glass from an annealing lehr to impart corresponding vertical movement to the carriage, means operative upon vertical movement of the carriage to move said back-up bar into firm engagement with the sheet of glass, means for operating the cutter, and means operative upon vertical movement of the carriage to set said last named means into operation.

2. An automatic glass sheet cut-off machine comprising a frame, a horizontal carriage supported by the frame for vertical movement on the frame, an adjustable stop supported by the carriage for engagement by the leading edge of a rising glass sheet to impart vertical movement to the carriage, a horizontal shaft journalled in the frame above the carriage, a sprocket wheel secured to the shaft adjacent each end thereof, a sprocket chain engaged with each sprocket wheel and having one end thereof attached to the carriage and the other end thereof attached to a counter-weight, a screw rotatably supported by the carriage and extending throughout the length thereof, a cutter carrier connected with the screw for movement longitudinally of the carriage upon rotation of the screw, a motor, a flexible drive shaft between the screw and motor, switch means operable by the moving carriage for setting the motor into operation, a back-up bar pivotally supported by the frame, and means connected with the horizontal shaft operable to move the back-up bar into frictional contact with the rising glass sheet upon vertical movement of the carriage.

3. An automatic glass sheet cut-off machine comprising a frame, an elongated carriage supported for vertical movement on the frame, a screw rotatably supported by the carriage and extending throughout the length thereof, a cutter carrier having connection with the screw for movement longitudinally of the carriage upon rotation of the screw, a stop supported by the carriage for engagement with the advancing edge of a rising glass sheet from an annealing lehr to impart like rising movement to the carriage, a motor, a flexible drive shaft interconnecting the screw and motor, a motor controlling switch connected with the frame, a trip supported by the carriage for actuating the switch upon rising movement of the carriage, a shaft rotatably supported by the frame above the carriage, a glass sheet engaging pressure bar pivotally supported by the frame, a cam connected with the shaft, a lever secured to the bar and pivotally supported by the frame, a roller carried by the lever and cooperating with the cam for moving the bar into contact with the glass sheet, and a counter-weight drive connection between the carriage and shaft for imparting rotation to the shaft upon rising movement of the carriage.

4. In an automatic glass sheet cut-off machine, a carriage adapted for parallel disposition with a sheet of glass to be cut, a cutter carrier horizontally movable on the carriage, a cutter pivotally supported by the carrier, yieldable means for urging the cutter into pressure contact with the glass sheet for cutting same upon movement of the carrier, means adjustably supported by the carriage for withdrawing the cutter from operative contact with the glass sheet against said yielding means, said last-named means comprising a wedge-shaped member adjustably supported by the carriage adjacent each end thereof, and a roller supported by the cutter carrier for alternate cooperation with said wedge-shaped members.

5. An automatic glass sheet cut-off machine comprising a frame, a carriage vertically movable in the frame and positioned adjacent to and parallel with the plane of movement of a continuously rising glass sheet from an annealing lehr, a cutter horizontally movable on the carriage for cutting the glass sheet widthwise thereof, a stop supported by the carriage engageable by the advancing edge of the glass sheet for vertically moving the carriage, means supported by the carriage for imparting movement to the cutter from one end of the carriage to the other, drive means set into operation by vertical movement of the carriage for operating said first means, and adjustable cam means to raise and lower the cutter at the limits of its horizontal movement to fix the length of the cut in the glass sheet.

6. An automatic glass sheet cut-off machine comprising a frame, a carriage vertically movable on the frame, a cutter carrier horizontally movable on the carriage, a cutter adjustably supported by the carrier, an adjustable stop on the carriage engageable by the advancing edge of a rising glass sheet for imparting corresponding movement to the carriage, rotatable cams supported by the frame, a horizontal pressure bar, a pair of levers each connected at one end thereof to the pressure bar, pivotally connected intermediate its ends with the frame and having a roller on its other end cooperating with a respective one of said cams, an operative connection between the carriage and cams for rotating the cams and bringing the pressure bar into frictional contact with the glass sheet upon vertical movement of the carriage, and means set into operation by the movable carriage for imparting movement to said cutter carrier.

7. An automatic glass sheet cut-off machine according to claim 6 wherein said levers are each of angular formation with the pivotal connections at the apices of the angles whereby corresponding portions of the levers below the pivotal connections will normally be vertical for maintaining the pressure bar in inoperative position between cutting-off operations.

8. In an automatic glass sheet cut-off machine, a vertically movable carriage having a horizontal housing at the upper edge thereof, a horizontal member intermediate its upper and lower edges, and a horizontal member having a vertical flange adjacent its lower edge, a cutter carrier horizontally movable on the carriage and including a frame, a nut supported by the frame and disposed in the housing, rollers supported by the frame engaging the upper and lower edges of the first horizontal member, rollers supported by the frame and engaging opposite sides of the vertical flange, a cutter supported by the lower end of the frame, and a rotatable screw in the housing and operatively engaged with the nut.

9. The structure according to claim 8 together with a guide member encircling said screw in spaced relation to each end of said nut, and a horizontal bar interconnecting said nut and guide members.

10. In an automatic glass sheet cut-off machine, a frame, a carriage vertically movable in the frame, a cutter carrier supported for longitudinal movement on the carriage, an adjustable stop on the carriage for engagement by the advancing edge of a rising glass sheet to impart like movement to the carriage, a cutter yieldably and adjustably supported by the carrier and disposed below the carriage for contact with one side of the glass sheet, a pressure bar disposed at the opposite side of the glass sheet, means operable by the vertically moving carriage to move the pressure bar into engagement with the glass sheet, and means set into operation by the vertically movable carriage for imparting movement to the cutter carrier.

11. In an automatic glass sheet cut-off machine, an elongated horizontal carriage including opposed angle bars defining a housing at the upper edge thereof, a horizontal bar at the lower edge thereof including a vertical flange and a horizontal bar intermediate the edges thereof, a cutter carrier including a vertical frame having rollers engaging said intermediate bar, and a roller engaging one side of said vertical flange, a nut in said housing and connected with said frame, a member pivotally connected with said frame and terminating below the carriage, a cutter supported by the lower end of said member, means yieldably urging the member toward the frame and a screw extending through said housing and operatively associated with said nut.

12. In an automatic glass sheet cut-off machine, an elongated horizontal carriage including an elongated vertical flange adjacent the lower edge thereof, a vertical frame longitudinally movable on the carriage, a vertical axis roller supported by the frame and engaging one side of said vertical flange, a cutter supporting member pivotally connected at its upper end to said frame, a cutter supported by the lower end of said member, a vertical axis roller supported by said member intermediate its ends, and spring means associated with said frame and said member for normally holding said last roller against the opposite side of said vertical flange.

13. The structure according to claim 12 together with cam means adjustably supported adjacent opposite ends of said vertical flange for moving said last roller away from said flange.

14. The structure according to claim 12 wherein said carriage includes cooperating angle bars defining a housing at the upper edge thereof, a nut in the housing, a detachable connection between the frame and nut and means in the housing for moving the nut longitudinally thereof.

15. An automatic glass sheet cut-off machine comprising a frame, a horizontal carriage supported for vertical movement on the frame, an adjustable stop supported by the carriage for engagement by the leading edge of a rising glass sheet to impart vertical movement to the carriage, a horizontal shaft journalled in the frame above the carriage, a sprocket wheel secured to the shaft adjacent each end thereof, a sprocket chain engaged with each sprocket wheel and having one end thereof attached to the carriage and the other end thereof attached to a counterweight, a screw rotatably supported by the carriage and extending throughout the length thereof, a cutter carrier frame connected with the screw for movement longitudinally of the carriage upon rotation of the screw, a motor, a flexible drive shaft between the screw and motor, switch means operable by the moving carriage for setting the motor into operation, a vertical guide flange on said carriage, a roller supported by said cutter frame engaging one side of said flange and cutter supporting arms pivotally connected with said cutter frame and having a roller in yieldable engagement with the other side of said flange.

LESLIE A. HINKLE.